(12) United States Patent
McGill

(10) Patent No.: US 8,688,379 B1
(45) Date of Patent: Apr. 1, 2014

(54) METHOD AND SYSTEM FOR GENERATING DRIVE TIME ISOCONTOURS USING NESTED GRAPHS

(75) Inventor: James Brian McGill, Forest Lodge (AU)

(73) Assignee: Google Inc., Mountain View, CA (US)

( * ) Notice: Subject to any disclaimer, the term of this patent is extended or adjusted under 35 U.S.C. 154(b) by 143 days.

(21) Appl. No.: 13/347,636

(22) Filed: Jan. 10, 2012

(51) Int. Cl.
 *G01C 21/34* (2006.01)
(52) U.S. Cl.
 USPC ........... 701/533; 701/410; 701/411; 701/412; 701/413; 701/414; 701/415; 701/416; 701/426; 701/527
(58) Field of Classification Search
 USPC ........................... 701/410–416, 426, 527, 533
 See application file for complete search history.

(56) References Cited

U.S. PATENT DOCUMENTS

| | | | | |
|---|---|---|---|---|
| 5,488,559 | A * | 1/1996 | Seymour | 701/446 |
| 5,802,492 | A * | 9/1998 | DeLorme et al. | 455/456.5 |
| 6,026,384 | A * | 2/2000 | Poppen | 705/400 |
| 7,353,114 | B1 * | 4/2008 | Rohlf et al. | 702/5 |
| 7,831,387 | B2 * | 11/2010 | Golding et al. | 701/438 |
| 7,933,395 | B1 * | 4/2011 | Bailly et al. | 379/201.04 |
| 8,160,400 | B2 * | 4/2012 | Snavely et al. | 382/305 |
| 2001/0028350 | A1 * | 10/2001 | Matsuoka et al. | 345/427 |
| 2003/0182052 | A1 * | 9/2003 | DeLorme et al. | 701/201 |
| 2004/0049341 | A1 * | 3/2004 | Fujiwara | 701/210 |
| 2004/0215390 | A1 * | 10/2004 | Nomura | 701/209 |
| 2005/0283503 | A1 * | 12/2005 | Hancock et al. | 707/200 |
| 2006/0074553 | A1 * | 4/2006 | Foo et al. | 701/212 |
| 2006/0253247 | A1 * | 11/2006 | de Silva et al. | 701/201 |
| 2007/0010942 | A1 * | 1/2007 | Bill | 701/209 |
| 2007/0014488 | A1 * | 1/2007 | Chen et al. | 382/294 |
| 2007/0143345 | A1 * | 6/2007 | Jones et al. | 707/104.1 |
| 2007/0225910 | A1 * | 9/2007 | Fujiwara | 701/211 |
| 2007/0260395 | A1 * | 11/2007 | Matsuoka et al. | 701/209 |
| 2007/0276585 | A1 * | 11/2007 | Hisada et al. | 701/200 |
| 2008/0154489 | A1 * | 6/2008 | Kaneda et al. | 701/201 |
| 2008/0215239 | A1 * | 9/2008 | Lee | 701/211 |
| 2008/0301643 | A1 * | 12/2008 | Appleton et al. | 717/124 |
| 2009/0018766 | A1 * | 1/2009 | Chen et al. | 701/202 |
| 2009/0088962 | A1 * | 4/2009 | Jones | 701/200 |
| 2009/0157295 | A1 * | 6/2009 | Asada et al. | 701/200 |
| 2009/0216443 | A1 * | 8/2009 | Shi | 701/211 |
| 2009/0231340 | A1 * | 9/2009 | Savornin | 345/440 |

(Continued)

OTHER PUBLICATIONS

"Delaunay/Dirichlet Tessellation", date unknown. Retrieved from http://www.passagesoftware.net/webhelp/Delaunay_Dirichlet_Tessellation.htm.*

(Continued)

*Primary Examiner* — Calvin Cheung
(74) *Attorney, Agent, or Firm* — McDermott Will & Emery LLP

(57) ABSTRACT

Systems, methods, and machine-readable media for determining one or more possible destinations that may be reached using a hierarchy of maps. The system may be configured to receive search parameters indicating a starting point and an allotted cost and identify a set of nodes on a first level map that may be reached given the allotted cost. If further level maps in the hierarchy of maps are to be searched, the system may identify nodes in other level maps in the hierarchy of maps that may be reached given the remaining allotted cost and add the identified nodes to the set of nodes. Based on the set of nodes, the system may calculate the area that may be reached from the starting point given the allotted cost.

22 Claims, 12 Drawing Sheets

(56) References Cited

U.S. PATENT DOCUMENTS

| | | | |
|---|---|---|---|
| 2009/0234577 A1* | 9/2009 | Rinscheid | 701/201 |
| 2009/0303036 A1* | 12/2009 | Sahuguet | 340/539.13 |
| 2010/0057353 A1* | 3/2010 | Friedman | 701/209 |
| 2010/0067824 A1* | 3/2010 | Sunkavalli et al. | 382/274 |
| 2010/0114475 A1* | 5/2010 | Shin et al. | 701/201 |
| 2010/0169003 A1* | 7/2010 | Van Der Meer | 701/207 |
| 2010/0217515 A1* | 8/2010 | Arai et al. | 701/201 |
| 2010/0268449 A1* | 10/2010 | Feng | 701/201 |
| 2010/0286899 A1* | 11/2010 | Jain et al. | 701/119 |
| 2011/0035141 A1* | 2/2011 | Barker et al. | 701/119 |
| 2011/0090094 A1* | 4/2011 | Yamada | 340/905 |
| 2011/0137508 A1* | 6/2011 | Garcia Manchado | 701/29 |
| 2011/0166777 A1* | 7/2011 | Chavakula | 701/201 |
| 2011/0218992 A1* | 9/2011 | Waldman et al. | 707/724 |
| 2011/0254702 A1* | 10/2011 | Yamada | 340/905 |
| 2011/0257949 A1* | 10/2011 | Vasudevan et al. | 703/2 |
| 2012/0047098 A1* | 2/2012 | Reem | 706/12 |

OTHER PUBLICATIONS

"Isocontour" definition, date unknown. Retrieved from http://www.wordsense.eu/isocontour/.*

"Level Set", date unknown. Retrieved from http://www.wordsense.eu/level_set/.*

Knopp et al., "Computing Many-to-Many Shortest Paths Using Highway Hierarchies", Workshop on Algorithm Engineering and Experiments (ALENEX), 2007, pp. 36-45.

Sanders et al., "Highway Hierarchies Hasten Exact Shortest Path Queries", 13th European Symposium on Algorithms (ESA), LNCS 3669, 2005, pp. 568-579.

* cited by examiner

200

310

600

800

900

1000

1100

METHOD AND SYSTEM FOR GENERATING DRIVE TIME ISOCONTOURS USING NESTED GRAPHS

BACKGROUND

The present disclosure generally relates to location based services and, in particular, to identifying points of interest that may be reached within a particular period of time.

Location based services are often used to find directions from one point of interest (POI) to another or to find the distance from one POI to another. However, in some applications, it may be helpful to identify an area (e.g., a set of destinations) that may be reached from a starting point during a fixed period of time (e.g., an allotted travel time). For example, a business or organization may need to decide where to place a new store or office. In making the decision of which location to place the new store or office, it may be useful to find out what area the new location will be able to serve (e.g., people living in a certain area will be able to reach the new location in 30 minutes or less). In another example, a business may need to determine where to send advertisements for an existing store or office. The business may determine that they will only target advertisements to people that may be within an hour drive of one of the business's locations. Other users may find the information helpful in figuring out which locations are convenient to visit.

The set of destinations that may be reached from a starting point within a predetermined time may be determined by using a brute force method to find all locations on a map that may be reached from the starting point within the predetermined time. However, the algorithms used to identify the locations typically require significant computing resources and processing time (e.g., the algorithms may have a time complexity of $O(n^2)$) to determine the area. As a result, an increase in size of the map, an increase in the complexity of the map, or an increase in the allotted travel time causes a very large increase in the computing resources and processing time needed to identify the area.

SUMMARY

According to another aspect of the subject technology, a system is provided for determining one or more possible destinations that may be reached using a hierarchy of maps, the hierarchy of maps comprising plurality of levels of maps. The system may include an interface module, a search module, a cost module, and an isocontour module. The interface module configured to receive search parameters indicating a starting point and an allotted cost. The search module configured to select a starting node that corresponds to the starting point, select a first level map in the hierarchy of maps that is the highest level map in the hierarchy of maps includes the starting node, identify a set of nodes on the first level map wherein each node in the set of nodes has a travel cost from the starting node that is less than the allotted cost, and determine if further level maps in the hierarchy of maps are to be searched. The cost module configured to calculate a remaining cost for each node in the set of nodes, the remaining cost being a difference between the allotted cost and the travel cost for the node. If further level maps in the hierarchy of maps are to be searched, the search module is further configured to identify second level nodes in the second level map wherein each second level node has a travel cost from one of the nodes in the set of nodes that is less than the remaining cost and add the identified second level nodes in the second level map to the set of nodes. The isocontour module configured to determine, based on the set of nodes, the area that may be reached from the starting point given the allotted cost.

According to one aspect of the subject technology, a method is provided for determining one or more possible destinations that may be reached using a hierarchy of maps, the hierarchy of maps comprising a plurality of level maps. The method may include receiving search parameters indicating a starting point and an allotted cost, selecting a starting node that corresponds to the starting point on a first level map, and identifying, using a processor, a set of nodes on the first level map wherein each node in the set of nodes has a travel cost from the starting node that is less than the allotted cost. For each node in the set of nodes, the method may include calculating a remaining cost for the node in the set of nodes, the remaining cost being a difference between the allotted cost and the travel cost for the node, identifying second level nodes on a second level map wherein each second level node has a travel cost from the node in the set of nodes that is less than the remaining cost, and adding the identified second level nodes in the second level map to the set of nodes. The method may further include determining, based on the set of nodes, the area that may be reached from the starting point given the allotted cost.

According to yet another aspect of the subject technology, a machine-readable medium including instructions stored therein, which when executed by a machine, cause the machine to perform operations. The operations may include receiving a request to determine an area that may be reached from a starting location, the request indicating the starting location and an allotted cost and selecting a starting node and a first level map in a hierarchy of maps, wherein the starting node corresponds to the starting location and the first level map is the highest level map in the hierarchy of maps that includes the starting node. The operations may also include identifying a set of nodes on the first level map wherein each node in the set of nodes has a travel cost from the starting node that is less than the allotted cost and determining if further level maps in the hierarchy of maps are to be searched. If further level maps are to be searched, the operations may include selecting a second level map in the hierarchy of maps, identifying second level nodes on the second level map wherein each second level node has a travel cost from the starting node that is less than the allotted cost, and adding the identified second level nodes in the second level map to the set of nodes. The operations may also include determining, based on the set of nodes, the area that may be reached from the starting point given the allotted cost.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Systems, methods, and machine-readable media for identifying one or more possible destinations that may be reached from a starting point using a fixed cost (e.g., within a predetermined period of time) are provided. As will be described in more detail below, in some aspects of the subject technology, the destinations that may be reached from a starting point in an allotted period of time may be determined by generating a hierarchy of maps (e.g., a "highway hierarchy") for a geographic area based on mapping data and using the hierarchy of maps to search for points that may be reached within the allotted period of time.

The hierarchy of maps may include multiple levels of maps where each level contains a different level of detail for the geographic area. For example, the highest level map may contain the sparsest amount of map data (e.g., the fewest paths and nodes) for the geographic area and lower level maps may contain more map data for the geographic area. The lowest level map may contain the most map data (e.g., all paths and nodes for the geographic area in a mapping database). By searching a higher level map with less map data for locations reachable within the allotted time and then performing a number of smaller searches on lower level maps, the system can reduce the complexity of the search needed to be executed and, as a result, determine the set of reachable locations faster and with fewer computing resources.

In some aspects of the subject technology, the system may use the points (e.g., nodes) that may be reached within the allotted period of time to generate an isocontour that may be displayed in a mapping interface (e.g., superimposed on a map) to illustrate an area that may be reachable from the starting point. The isocontour may be one or more shapes or polygons that include the destinations that may be reached from the starting point based on the fixed cost (e.g., the allotted travel time).

Figure 1:
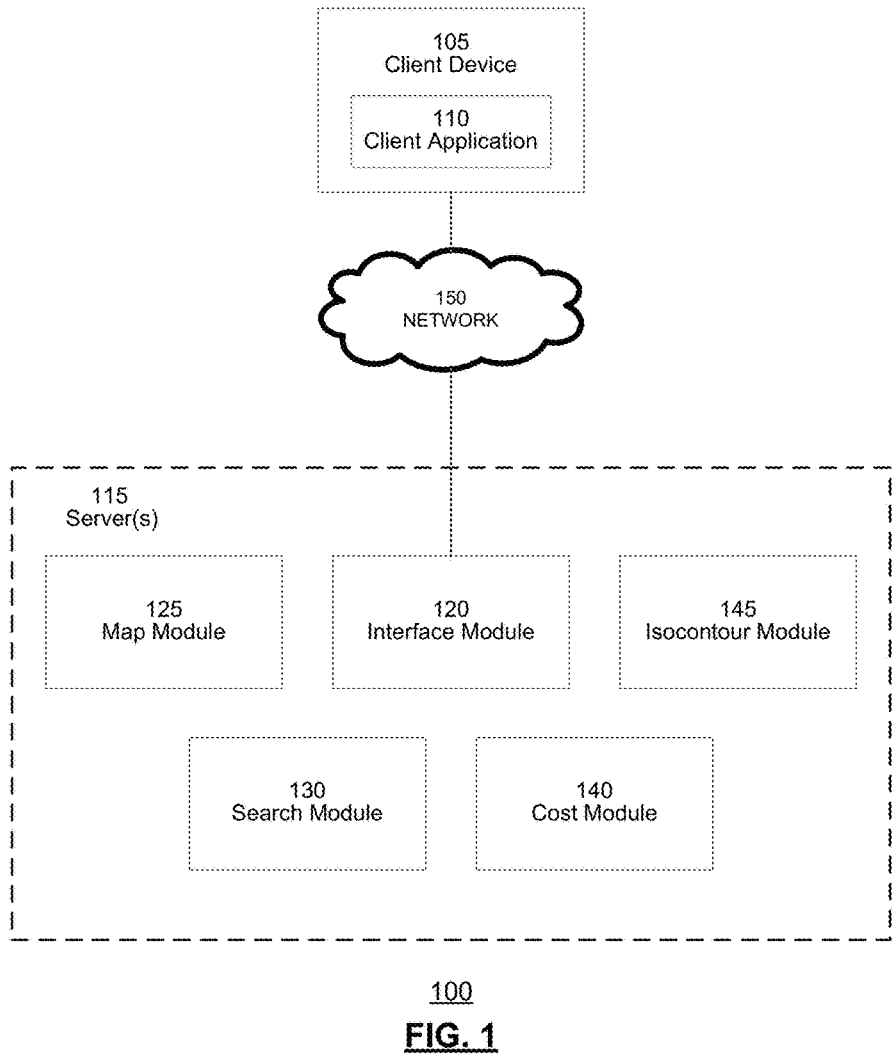
FIG. 1 is a conceptual block diagram illustrating an environment for determining one or more destinations that may be reached using a hierarchy of maps in accordance with various aspects of the subject technology.

FIG. 1 is a conceptual block diagram illustrating an environment 100 for determining one or more destinations that may be reached using a hierarchy of maps in accordance with various aspects of the subject technology. Although FIG. 1 illustrates a client-server network environment 100, other aspects of the subject technology may include other configurations including, for example, peer-to-peer environments or single system environments. The network environment 100 may include at least one server 115 and at least one client device 105 connected over a network 150. The network 150 can include, for example, any one or more of a cellular network, a satellite network, a personal area network (PAN), a local area network (LAN), a wide area network (WAN), a broadband network (BBN), the Internet, and the like.

The client device 105 may be any machine able to transmit to the server 115 a request for determining an area that may be reached within a predetermined period of time. The request may indicate a starting point and an allotted period of time that may be used to determine the destinations that may be reached. The client device 105 may also be able to receive communications (e.g., information defining the destinations that may be reached) from the server 115 and generate a display for a user. In some aspects, client device 105 may be a desktop computer, a laptop, a mobile device (e.g., a phone, tablet, personal digital assistant (PDA), etc.), a global positioning system (GPS) device, or any other machine with a processor, memory, and communications capabilities. The client device 105 may also include one or more client applications 110 (e.g., a web browser or "mobile app") that may be configured to transmit requests to the server 115, receive communications from the server 115, and generate a display for the user.

The server 115 may be any system or device having a processor, a memory, and communications capability that may be used to identify the destinations that may be reached using a hierarchy of maps. In some aspects, the server 115 may be a virtual entity that might refer to a cluster or even multiple clusters of servers.

According to various aspects of the subject technology, the server 115 may include an interface module 120, a map module 125, a search module 130, a cost module 140, and an isocontour module 145. However, in other aspects one or more of the modules (e.g., the isocontour module 145) may reside on the client device 105. The interface module 120 may be configured to communicate with client devices 105 and other servers. For example, the interface module 120 may receive a request for a set of locations that may be reached from a starting point within a predetermined cost.

Mapping Data

The map module 125 may be configured to retrieve mapping data from one or more databases and generate a hierarchy of maps based on the mapping data. The mapping data may include all the known paths (e.g., roads, highways, waterways, airways, pedestrian walkways, or other routes) in a geographic area. The geographic area may be, for example, a city, a county, a state, a territory, a country, a continent, a world, etc. In some aspects, the paths in the mapping data may be limited to one or more types of paths such as drivable paths.

Figure 2:
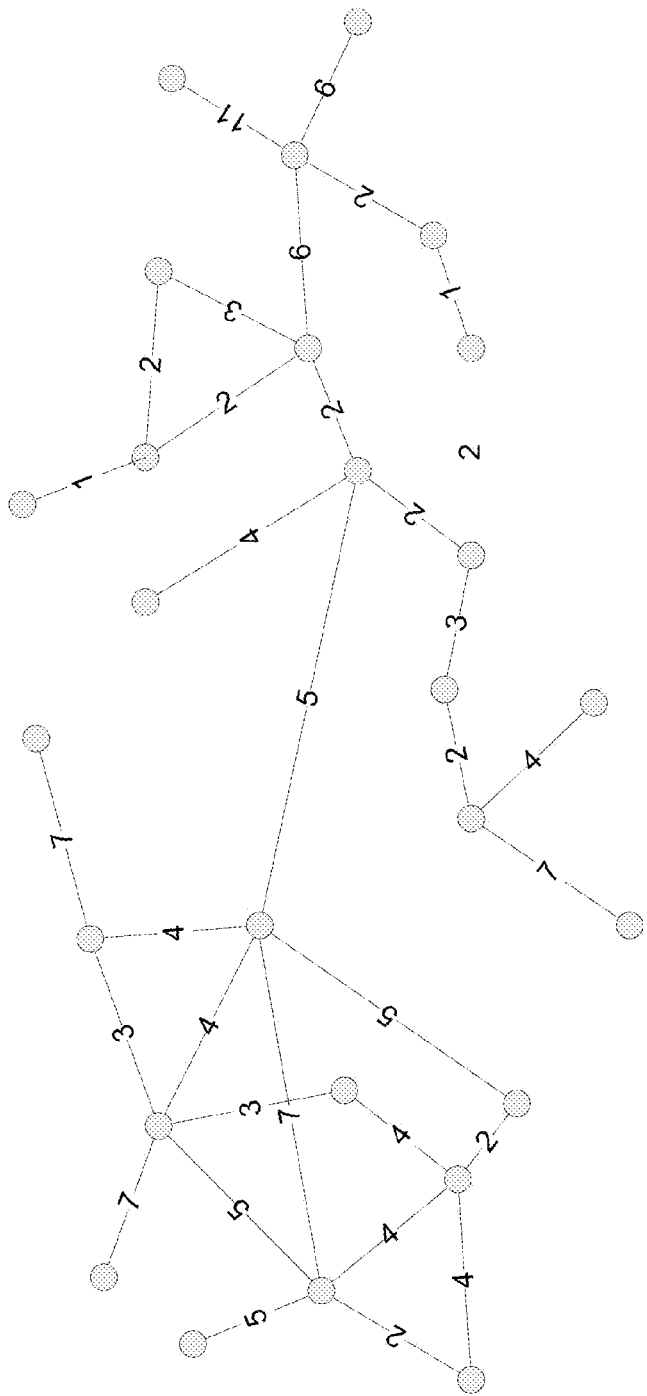
FIG. 2 is a conceptual illustration of mapping data for one or more destinations according to various aspects of the subject technology.

FIG. 2 is a conceptual illustration of mapping data for an area 200 according to various aspects of the subject technology. The mapping data 200 may include a graph or a network containing a number of nodes and path segments connecting the nodes. The nodes in the mapping data 200 may represent any type of location that may be reached using the paths in the mapping data 200. For example, a node may be an intersection between two paths, a point where a path splits into two paths, an arbitrary point on a path, or any other point on the map (e.g., a location coordinate). Other representation of the mapping data 200 may also be used. For example, nodes in the mapping data 200 may represent paths and edges may represent destinations.

The nodes and path segments in the mapping data 200 may also be associated with costs. The cost associated with a path segment may be a measurement of an estimated time needed to traverse the path segment. A path segment's cost may be calculated based on the length of the path segment and a speed for traveling the path segment. The speed for traveling the path may be based on the speed limit associated with the path segment, the average speed for path segments of that type (e.g., the average speed for a highway versus a neighborhood street), or the average speed detected for that path segment using one or more sensors. The speed for the path segment may also be based on a traffic level associated with the path segment.

The cost module 140 may be configured to calculate the cost of nodes in the mapping data. The cost associated with a node may represent the estimated time needed to reach a node from a given starting position and may be calculated based the costs for the path segments that connect the node from the starting position.

Generating a Hierarchy of Maps

Based on the retrieved mapping data 200, the map module 125 may generate a hierarchy of maps. In some aspects, the hierarchy of maps may be generated by finding the shortest route between every pair of nodes in the mapping data 200 using graph search algorithms, such as Dijkstra's algorithm. A popularity level may then be calculated for each path segment based on the number of routes that include the path segment. To illustrate this concept, given map data for a hypothetical geographic area, the popularity level for path segments corresponding to highways or freeways may be high, while the popularity level for path segments corresponding to city streets may be lower, and lower still may be the popularity level for path segments corresponding to neighborhood streets or country roads.

The map module 125 may then generate a hierarchy of maps that includes at least two levels of maps based on the popularity levels of the path segments. For example, the higher level map may include all path segments above a certain popularity level while a lower level map may include all path segments above a lower popularity level. The lowest level map in the hierarchy of maps may include all path segments in the mapping data, regardless of their popularity levels. Level maps that are adjacent in the hierarchy of maps may also share a common set of nodes and path segments.

The number of levels of maps generated may depend on various factors such as available computing resources, available time, and desired level of accuracy. In one aspect, the map module 125 may generate the hierarchy of maps in advance (e.g., offline) so that the computing resources that would have been used to generate the hierarchy of maps will not effect the performance when the system generates an isocontour. Furthermore, the hierarchy of maps may be generated in such a way that the shortest path between any two locations may be found by searching first a higher level graph and then a lower level graph.

Figure 3:
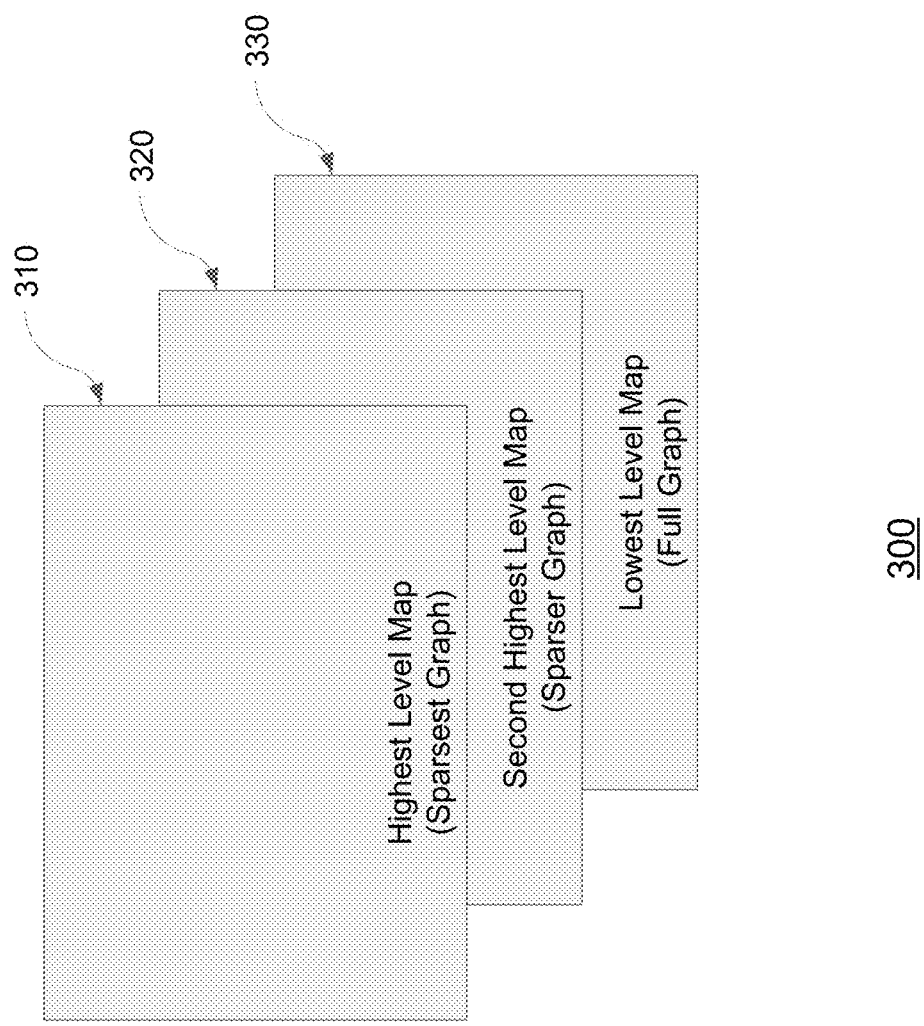
FIG. 3 is a conceptual illustration of a hierarchy of maps that may be generated using mapping data according to various aspects of the subject technology.
Figure 4:
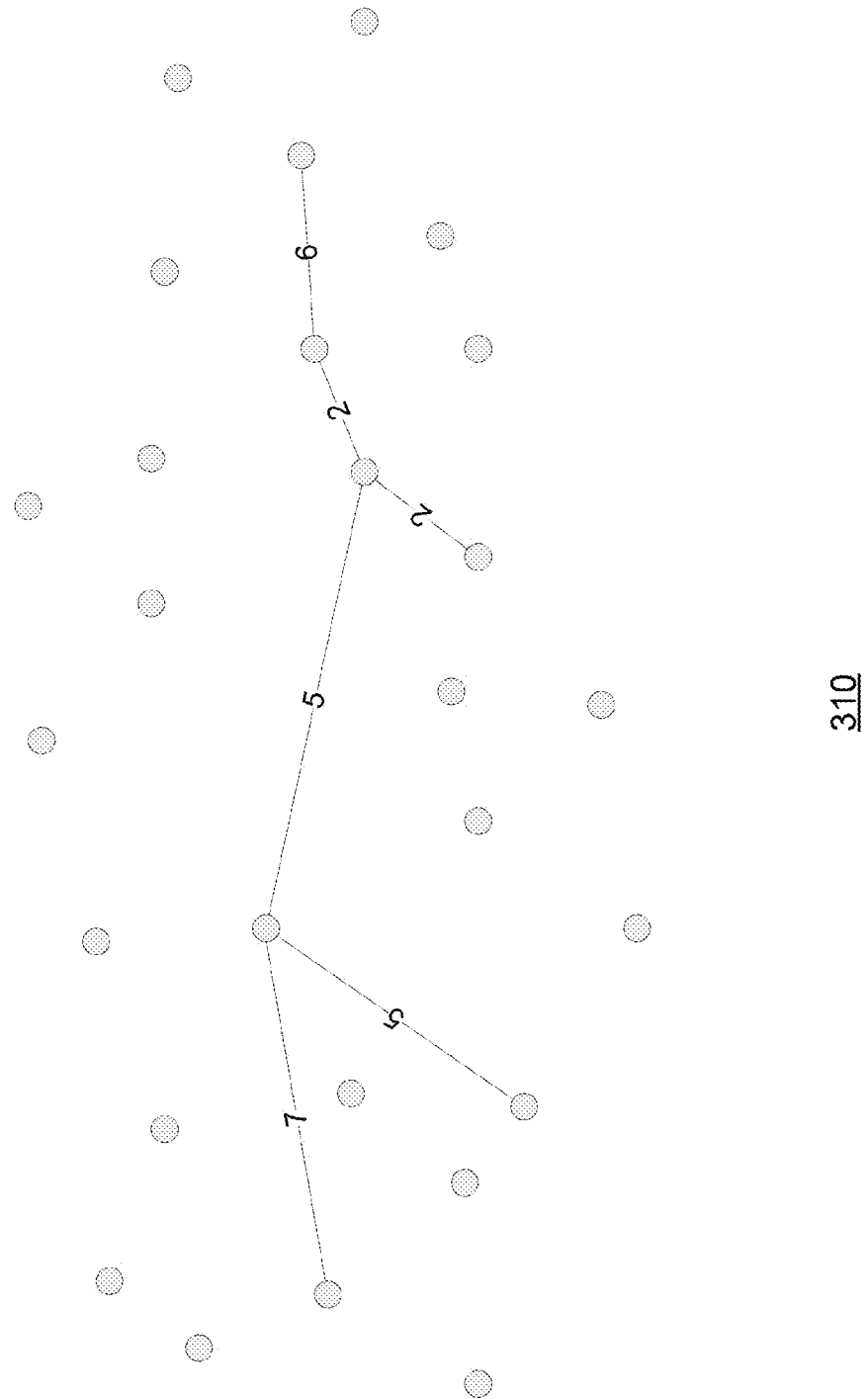
FIG. 4 is a conceptual representation of the highest level map of FIG. 3 according to various aspects of the subject technology.

FIG. 3 is a conceptual illustration of a hierarchy of maps 300 that may be generated using mapping data 200 according to various aspects of the subject technology. Although hierarchies of maps may include any number of maps, the hierarchy of maps 300 illustrated in FIG. 3 contains 3 levels of maps 310, 320, and 330. The highest level map 310 may include all path segments that have a popularity level above a high threshold. Because of the high threshold, the highest level map 310 may include the least number of path segments (e.g., the sparsest level of detail). FIG. 4 is a conceptual representation of the highest level map 310 of FIG. 3 according to various aspects of the subject technology.

Figure 5:
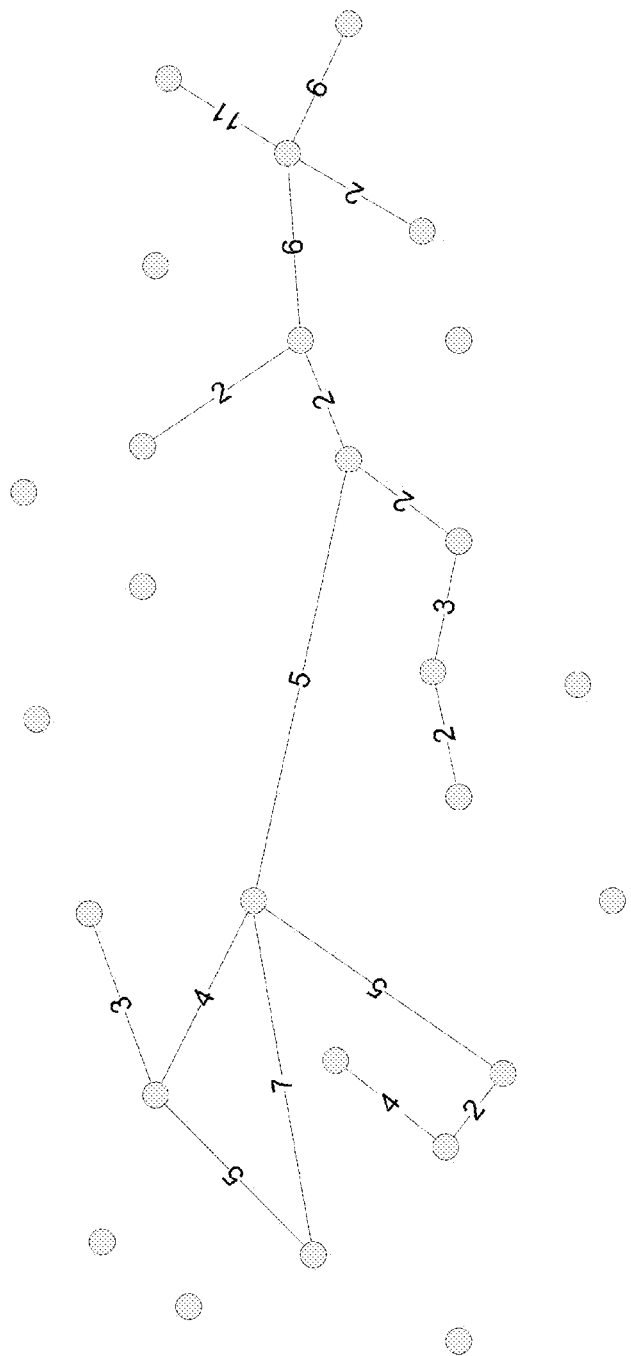
FIG. 5 is a conceptual representation of the second highest level map of FIG. 3 according to various aspects of the subject technology.
Figure 6:
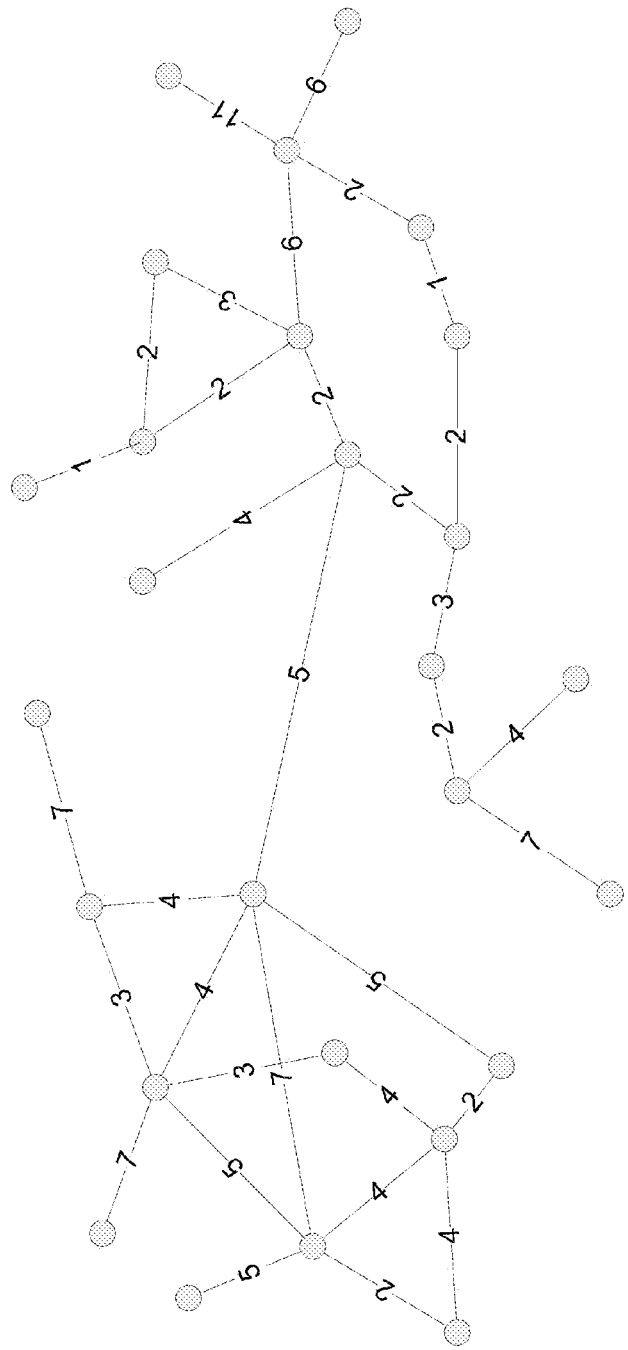
FIG. 6 is a conceptual representation of the lowest level map of FIG. 3 according to various aspects of the subject technology.

The second highest level map 320 may include all path segments that have a popularity level above a low threshold. Because of the low threshold, the second highest level map 320 may include the more path segments than the highest level map 310, but a fewer number of path segments than the mapping data 200 includes. FIG. 5 is a conceptual representation of the second highest level map 320 of FIG. 3 according to various aspects of the subject technology. The lowest level map 330 may include all path segments contained in the mapping data 200. FIG. 6 is a conceptual representation of the lowest level map 330 of FIG. 3 according to various aspects of the subject technology.

In some aspects, the hierarchy of maps may be generated based on the type of paths in the mapping data 200. For example, the map module 125 may separate the mapping data 200 into different categories of paths and each category of paths may be put into one or more map levels in the hierarchy of maps. For example, the highest level map 310 (e.g., the sparsest level map) may include only path segments that correspond to highways and freeways. The next highest level map 320 may also include path segments that correspond to city streets, and the lowest level map 330 may further include all other path segments in the mapping data (e.g., path segments that correspond to neighborhood streets and small roads).

Identifying Nodes in the Hierarchy of Maps

The search module 130 may be configured to identify nodes in the hierarchy of maps that have a travel time from a starting point that is less than or equal to an allotted period of time and add the identified nodes to a set of nodes that may be reached from the starting point using the allotted period of time. The search module 130 may begin by identifying a node in the mapping data 200 that corresponds to a starting point (e.g., the starting point indicated by the request received from the client device 105). The search module 130 may then identify the highest level map in the hierarchy of maps that includes the starting node. Using that map in the hierarchy of maps, the search module 130 may search the paths connected to the starting node for other nodes that have a travel time that is less than or equal to the allotted period of time.

For each node identified, the search module 130 may use a lower level map to search, from that node, for further nodes that have travel times that are less than or equal to the allotted period of time. According to one aspect, the nodes found at this lower level map may added to the set of nodes that may be reached from the starting point within the allotted period of time.

In another aspect, the cycle may repeat one or more times down the hierarchy of maps (e.g., using an even lower level map) and the nodes found may be added to the set of nodes that may be reached from the starting point within the allotted period of time. The number of levels of maps searched by the search module 130 may depend on, for example, the total number of levels in the hierarchy of maps, the desired accuracy, and the desired performance (e.g., how fast the area needs to be calculated). Although searching down more levels of maps would increase accuracy, it would also require more time and computing resources to complete. In some aspects, the calculation of the area that may be reached in the allotted time may be done "on-the-fly," meaning that a rough calculation of the area may be provided first and, while the search module 130 continues to search down more and more levels of the maps, more accurate calculations of the area may be provided as they are calculated.

In some aspects, instead of searching for all nodes that have travel time less than the allotted period of time, the search module 130 may search for nodes with the greatest travel time on a particular path without exceeding the allotted period of time (e.g., the travel time to the node on a path is less than or equal to the allotted time, but the travel time to the next node on the path is greater than the allotted time). In such aspects, only these nodes may be added to the set of nodes used to generate a reachable area.

By first searching the higher level map with fewer paths for nodes that are reachable within an allotted period of time and then performing smaller searches on lower level maps, a system may reduce the complexity of the search needed to be executed and, as a result, the system may be able to determine the reachable area faster and with fewer computing resources. Further details regarding the process of using a hierarchy of maps to identify an area that may be reached are discussed with respect to FIG. 7.

Computing the Area

After the set of nodes that may be reached from the starting point within the allotted period of time (e.g., within a predetermined amount of traveling time) is identified by the search module 130, the isocontour module 145 may be configured to generate calculate the area that may be reached from the starting point within the allotted period of time. In some aspects, the isocontour module 145 may generate an isocontour (e.g., one or more polygons covering the set of nodes) to help a user visualize the set of possible destinations that are reachable from the starting point (e.g., the travel range) given the allotted travel time.

The isocontour may be an convex hull of the set of nodes that be generated using any of several algorithms. In one aspect, the isocontour may be generated by using a Delaunay tessellation based on the set of identified nodes. The Delaunay tessellation may generate a closed polygon that represents the area reachable from the starting point within the allotted cost (e.g., the allotted time).

In one aspect, the hierarchy of maps may include only the drivable paths in the mapping data. As a result, the isocontour generated by the isocontour module 145 may represent the set of destinations reachable by driving within the allotted period of time. In some cases however, based on the algorithm used to generate the isocontour, some areas covered by the isocontour (e.g., areas not along the drivable paths) may not be reachable by driving, instead, such areas may be reachable by driving, then using some other mode of transportation (e.g., walking, boating, swimming, etc.).

Figure 7:
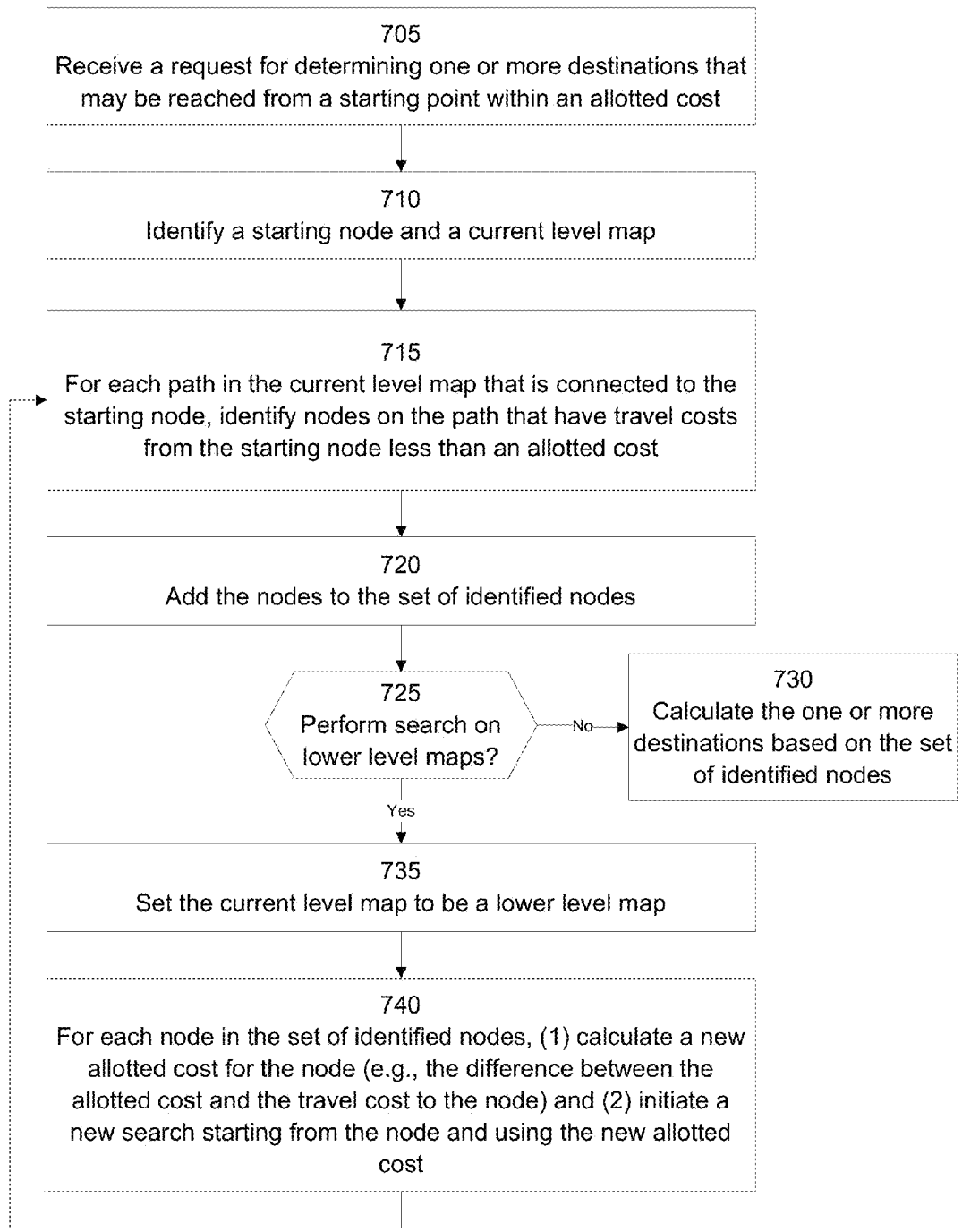
FIG. 7 is a flow chart illustrating a process for determining one or more destinations that may be reached using a hierarchy of maps in accordance with various aspects of the subject technology.

FIG. 7 is a flow chart illustrating a process 700 for determining one or more destinations that may be reached using a hierarchy of maps, in accordance with various aspects of the subject technology. Although the operations in process 700 are shown in a particular order, certain operations may be performed in different orders or at the same time.

The process 700 may begin at operation 705, when the interface module 120 receives a request for determining one or more destinations that may be reached from a starting point within a particular period of time. The request may indicate the starting point (e.g., location coordinates of a starting location) and the allotted period of time that may be used to compute the area. To help illustrate, a simple example the interface module 120 may receive a request to determine the destinations that may be reached from a given starting point within 10 time units (e.g., 10 minutes) will be discussed with respect to FIG. 8-FIG. 11.

At operation 710, the search module 130 may identify a starting node that corresponds to the starting point and add the starting node to a set of nodes that may be reached from the starting point, within the allocated period of time. The search module 130 may also identify a current level map based on the identified starting node. For example, the current level map may be the highest level map in the hierarchy of maps that includes a node that corresponds to the starting point, which may or may not be the highest level map in the hierarchy of maps. For example, FIG. 8 is a conceptual representation of the highest level map 800 that includes the starting node 805 according to various aspects of the subject technology.

Next, at operation 715, the search module 130 may search for the nodes connected by paths in the current map level to the starting node 805 that may be reached within the allotted period of time. For example, for each path in the current level map that is connected to the starting node, the search module 130 may identify at least one node on the path that has a travel time from the starting node less than or equal to an allotted period of time.

Figure 8:
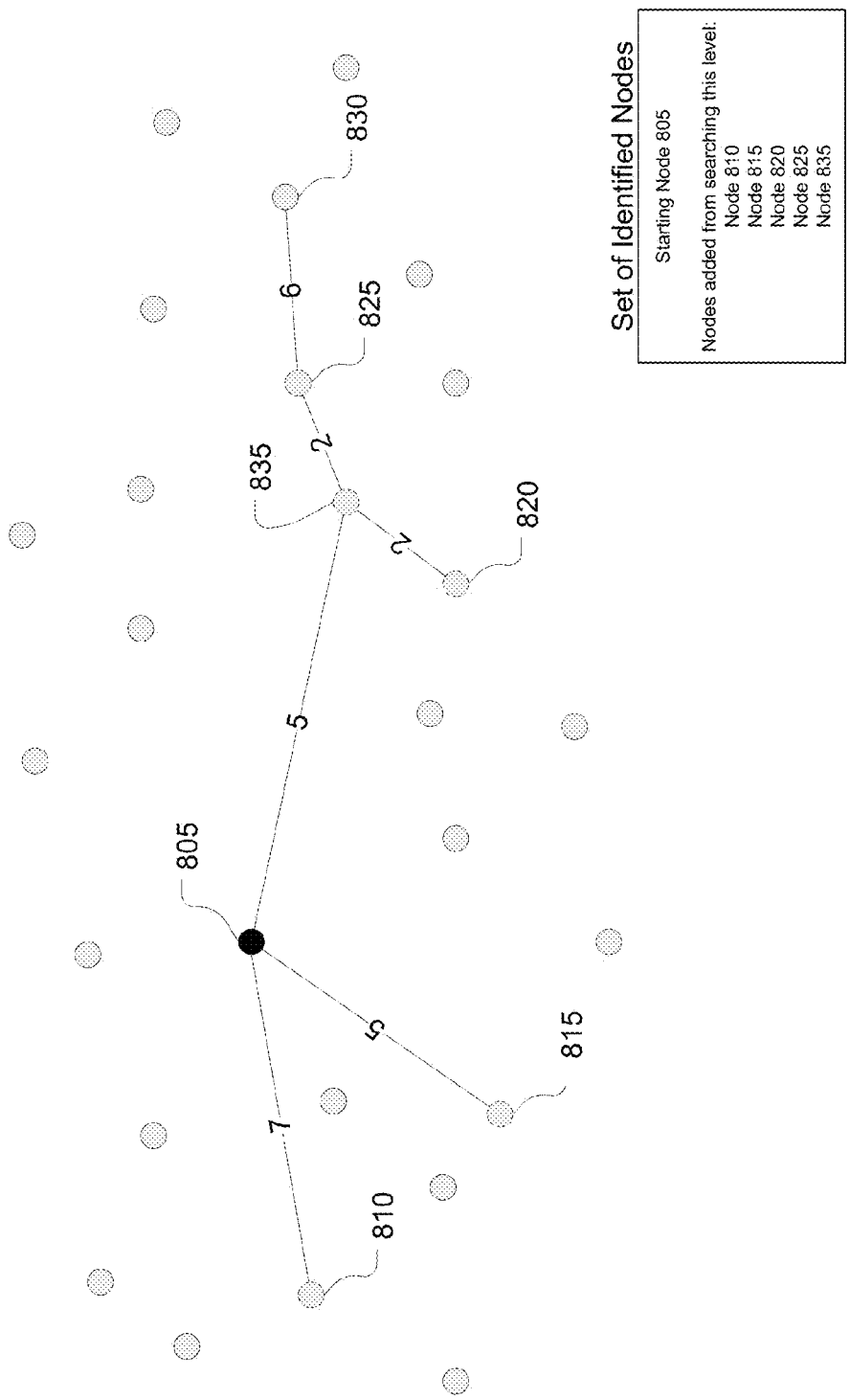
FIG. 8 is a conceptual representation of the highest level map that includes a starting point according to various aspects of the subject technology.

With respect to FIG. 8, operation 715 would identify nodes 810, 815, 820, 825, and 835. Nodes 810, 815, 820, 825, and 835 have travel times from the starting node that are less than the allotted travel time of 10 minutes. As a result, the identified nodes 810, 815, 820, 825, and 835 are added to a set of identified nodes at operation 720. For node 830, the travel time to reach the node 835 is 13 minutes based on the path segments needed to be traversed to get from the starting node 805 (5+2+6) which is over the allotted travel time (10 minutes). As a result, the node 830 may be marked as visited and may be ignored (e.g., the node 830 may be pruned from searches on lower level maps).

At operation 725, the search module 130 determines whether lower level maps need to be searched. The search module 130 may be configured to search a predetermined number of level maps, search level maps until the lowest level map is reached, or search a number of level maps based on various factors (e.g., the level of accuracy desired or the search performance desired). If no additional level maps need to be searched, at operation 730, the isocontour module 145 may calculate the destinations that may be reached within the allotted period of time based on the set of identified nodes.

If additional level maps are to be searched, the cost module 140 may reset the current level map to be a lower level map in the hierarchy of maps at operation 735. Furthermore, at operation 740, the cost module 140 may calculate a new allotted period of time for each of the nodes placed in the set of identified nodes by the search module 130. The new allotted period of time may be defined by the formula:

New Allotted Period of Time=Allotted Period of
Time−Time Needed to Reach the Node.

For example, referring back to FIG. 8, the new allotted period of time for node 810 would be 3 minutes (10−7), the new allotted period of time for node 815 would be 5 minutes (10−5), the new allotted period of time for node 820 would be 3 minutes (10−5−2), the new allotted period of time for node 825 would be 3 minutes (10−5−2), and the new allotted period of time for node 835 would be 5 minutes (10−5).

A search may then be initiated for each node in the set of identified nodes with each node as the new starting node and using the new allotted period of time associated with the node. Each search may attempt to identify nodes on paths connected to the new starting node with a travel time that is less than or equal to the new allotted period of time associated with new starting node.

Figure 9:
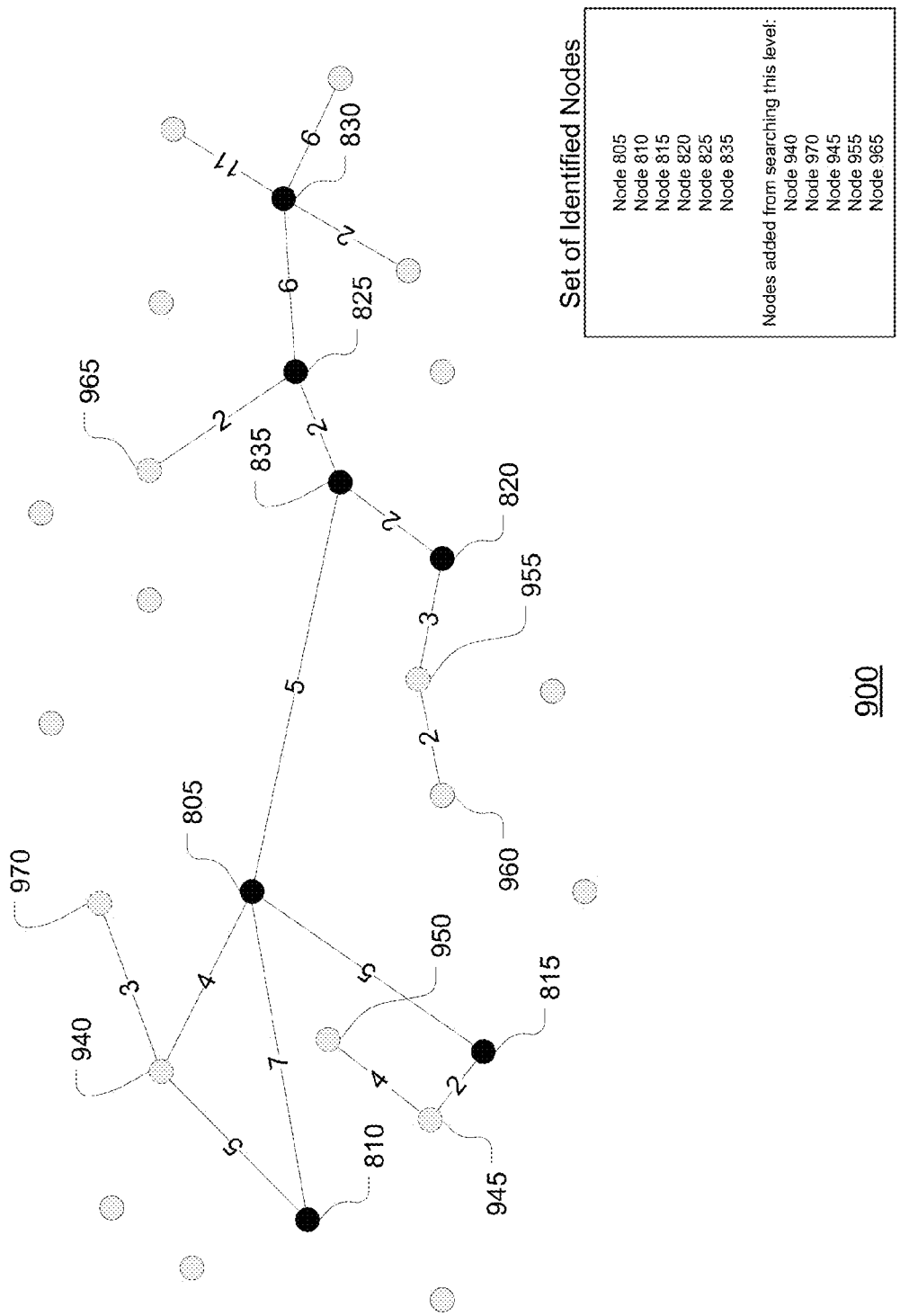
FIG. 9 is a conceptual representation of a lower level map according to various aspects of the subject technology.

FIG. 9 is a conceptual representation of a lower level map 900 according to various aspects of the subject technology. The filled in nodes represent the nodes that have already been visited in the search performed on the higher level map 800 illustrated in FIG. 8. As mentioned above, new searches may be performed on the current level map 900 for nodes 805, 810, 815, 820, 825, and 835 in the set of identified nodes using the new allotted period of time associated with each node. In some aspects, the searches may be performed one at a time or in parallel.

The search starting from node 810 using the new allotted period of time of 3 minutes (10−7) does not find any additional nodes because the next unvisited node 940 has a travel time from node 810 (5 minutes) is greater than the new allotted period of time (3 minutes). However, unvisited node 940 may be identified based on the search from node 805 because the travel time from to node 940 from node 805 (4 minutes) is less than the allotted time for node 805 (10 minutes). The search from node 805 may also identify unvisited node 970 which has a travel time (4+3=7 minutes) from node 805 that is less than the allotted time (10 minutes) for node 805.

The search starting from node 815 using the new allotted cost of 5 minutes (10−5) may identify node 945 which has a travel time (2 minutes) that is less than the new allotted time (5 minutes). The next node on the path 950 may visited and ignored or pruned from the search because it has a travel time (2+4=6 minutes) that is greater than the new allotted time (5 minutes). Node 945 may then be added to the set of identified nodes that may be used to search the next level.

The search starting from node 820 using the new allotted time of 3 minutes (10−7) may identify node 955 which has a travel time (3 minutes) that is equal to the new allotted time (3 minutes). The next node on the path 960 may be visited and pruned because it has a travel time of 5 minutes (3+2) which is greater than the new allotted time (3 minutes). Node 955 may then be added to the set of identified nodes that may be used to search the next level.

The search starting from node 825 using the new allotted time of 3 minutes (10−7) may identify node 965 which has a travel time (2 minutes) that is less than the new allotted time (3 minutes). The path from node 825 to node 830 is pruned because node 830 has already been visited in the higher level map 800. Node 965 may then be added to the set of identified nodes that may be used to search the next level.

The search starting from node 835 using the new allotted time of 5 minutes (10−5) does not find any additional nodes because there are no unvisited nodes connected to node 835 of the current level map.

After the lower level map 900 is searched, the search module 130 may again determine whether other level maps need to be searched. If no additional level maps need to be searched, the set of identified nodes may be provided to a client machine or server. In other aspects, the isocontour module 145 may calculate the area that may be reached within the allotted cost based on the set of identified nodes.

Assuming, for this example, that a final level map is to be searched, however, the cost module 140 may reset the current level map to be an even lower level map in the hierarchy of maps and calculate a new allotted time for each of the nodes placed in the set of identified nodes by the search module 130. A search may then be initiated for each node in the set of identified nodes with the node as the new starting node and using the new allotted time associated with the node.

Figure 10:
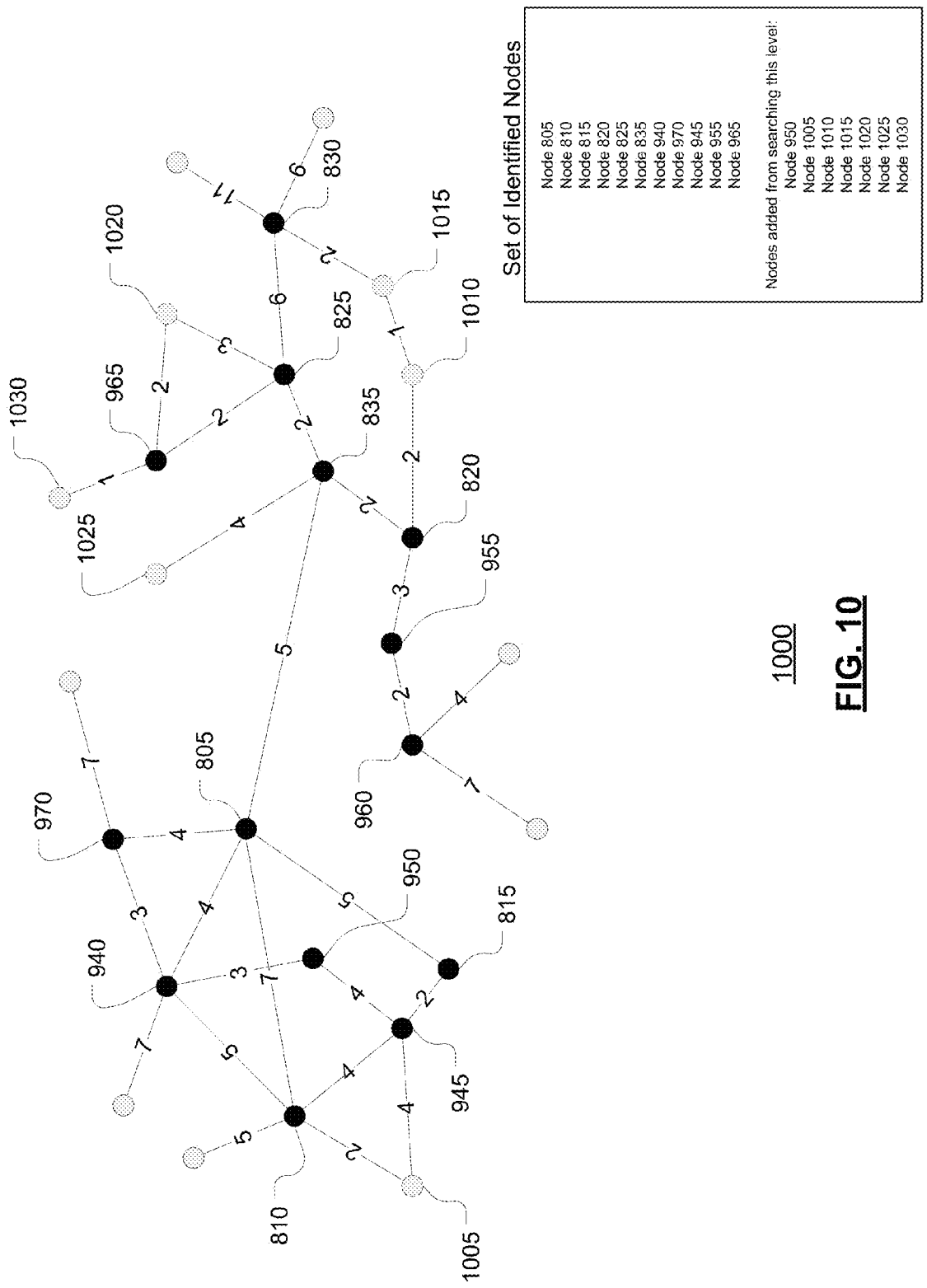
FIG. 10 is a conceptual representation of a lower level map according to various aspects of the subject technology.

FIG. 10 is a conceptual representation of a lower level map 1000 according to various aspects of the subject technology. The filled in nodes represent the nodes that have already been visited in the search performed on the higher level map 900 illustrated in FIG. 9. Searches on the lower level map 1000 may be performed for nodes in the set of identified nodes using the new allotted time associated with each node.

The searches starting from nodes 805, 815, 955 do not find any additional nodes because they are not connected to any unvisited nodes on the current level map. The search starting from node 810 using the new allotted time of 3 minutes may identify node 1005 because node 1005 is the only node connected to node 810 that has a travel time (2 minutes) that is less or equal to its new allotted time (3 minutes). The search starting from node 820 using the new allotted time of 3 minutes may identify nodes 1010 and 1015 because nodes 1010 and 1015 are the only unvisited nodes connected to node 820 that have travel times that are less or equal to than its new allotted time (3 minutes).

The search starting from node 825 using the new allotted time of 3 minutes may identify unvisited node 1020 because node 1020 is the only unvisited node connected to node 825 that has a travel time (3 minutes) that is less or equal to its new allotted time (3 minutes). The search starting from node 835 using the new allotted time of 5 minutes may identify unvisited node 1025 because node 1025 is the only unvisited node connected to node 835 that has a travel time (4 minutes) that is less or equal to its new allotted time (5 minutes). The search starting from node 940 may identify node 950 which has a travel time (3 minutes) that is less than the new allotted time (6 minutes) for node 940.

The searches starting from nodes 970 and 945 do not find any additional nodes because the travel times to all unvisited nodes connected to the nodes 970, and 945 exceed the new allotted time for nodes. The search starting from node 955 does not find any additional nodes because there are no unvisited nodes connected to node 955 on the current level map. The search starting from node 965 may identify node 1030 which has a travel time (1 minute) that is equal to the new allotted time (1 minute) for node 965. As a result, nodes 950, 1005, 1010, 1015, 1020, 1025, and 1030 may be added based on the searches performed on the current level map 1000.

After searching level map 1000, the search module 130 may determine that no additional level maps are to be searched and the set of identified nodes may be provided to an isocontour module 145 or another system (e.g., a client or server) so that an area representing the area that may be reached within the allotted time may be calculated. The area may be one or more polygons that includes all locations associated with the set of identified nodes.

Figure 11:
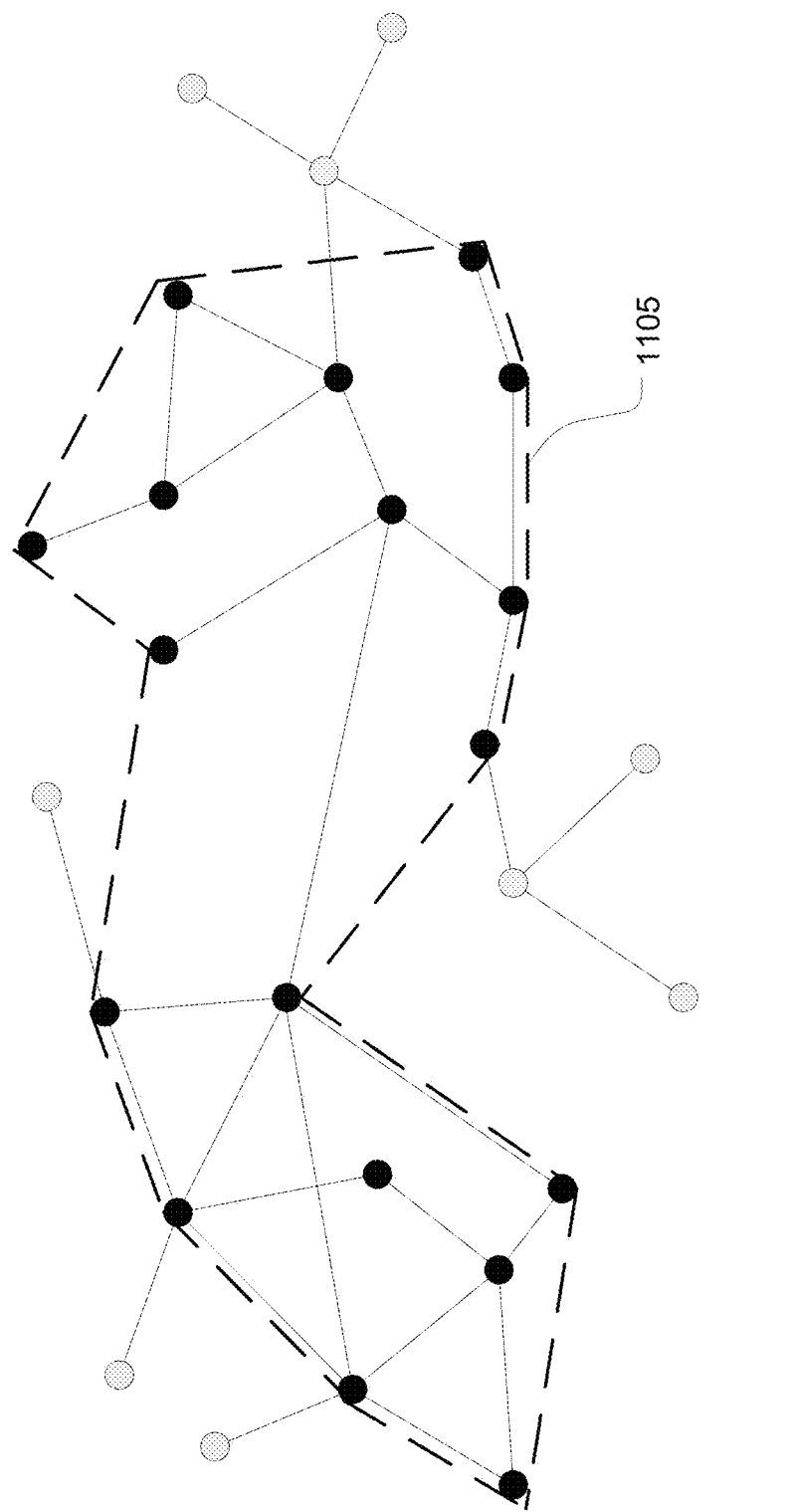
FIG. 11 is a conceptual representation of a user interface that displays an isocontour according to various aspects of the subject technology.

For example, FIG. 11 is a conceptual representation of a user interface 1100 that displays an isocontour 1105 according to various aspects of the subject technology. The filled in nodes may represent the set of nodes that have been identified by the search module 130 as being reachable from the starting point within the predetermined allotted period of time. Based on the set of identified nodes, the isocontour module 145 may generate the isocontour 1105. In some aspects, the isocontour module 145 may calculate the area that may be reached within the allotted period of time based on the set of identified nodes using a Delaunay tessellation method.

As discussed above, the starting node that corresponds to the starting point may not be in the highest level map of the hierarchy of maps. In some aspects of the subject technology, if the starting node is not in the highest level map, the search module 130 may use the highest level map that includes the starting node and search for nodes connected to the starting node that are within the allotted time and included in a higher level map. If a node with a higher level map is found, the search module 130 may switch to the higher level map to continue the search for additional nodes.

In this way, the search module 130 may attempt to search going up the hierarchy of maps in order to use the highest level map available. Only when the limit of the allocated time is reached during a search (e.g., when a node on a path is reached wherein the node has a travel time less than or equal to the allocated time and the next node on the path has a travel time more than the allocated time) will the search module 130 move down the hierarchy of maps to a lower level map with a greater level of detail and continue the search.

Although the example discussed with respect to FIG. 8-FIG. 11 determines the possible destinations that are reachable from a starting point within an allotted period of time, in some aspects, instead of using an allotted period of time, the system may determine possible destinations that are reachable using an allotted cost. The cost may be any unit of measure such as, for example, a monetary unit, a unit labor or energy, another unit of time, or some other measurement of expenditure. In some aspects, the costs associated with the path segments of nodes in the mapping data may be calculated based some other unit of measure instead of time.

Figure 12:
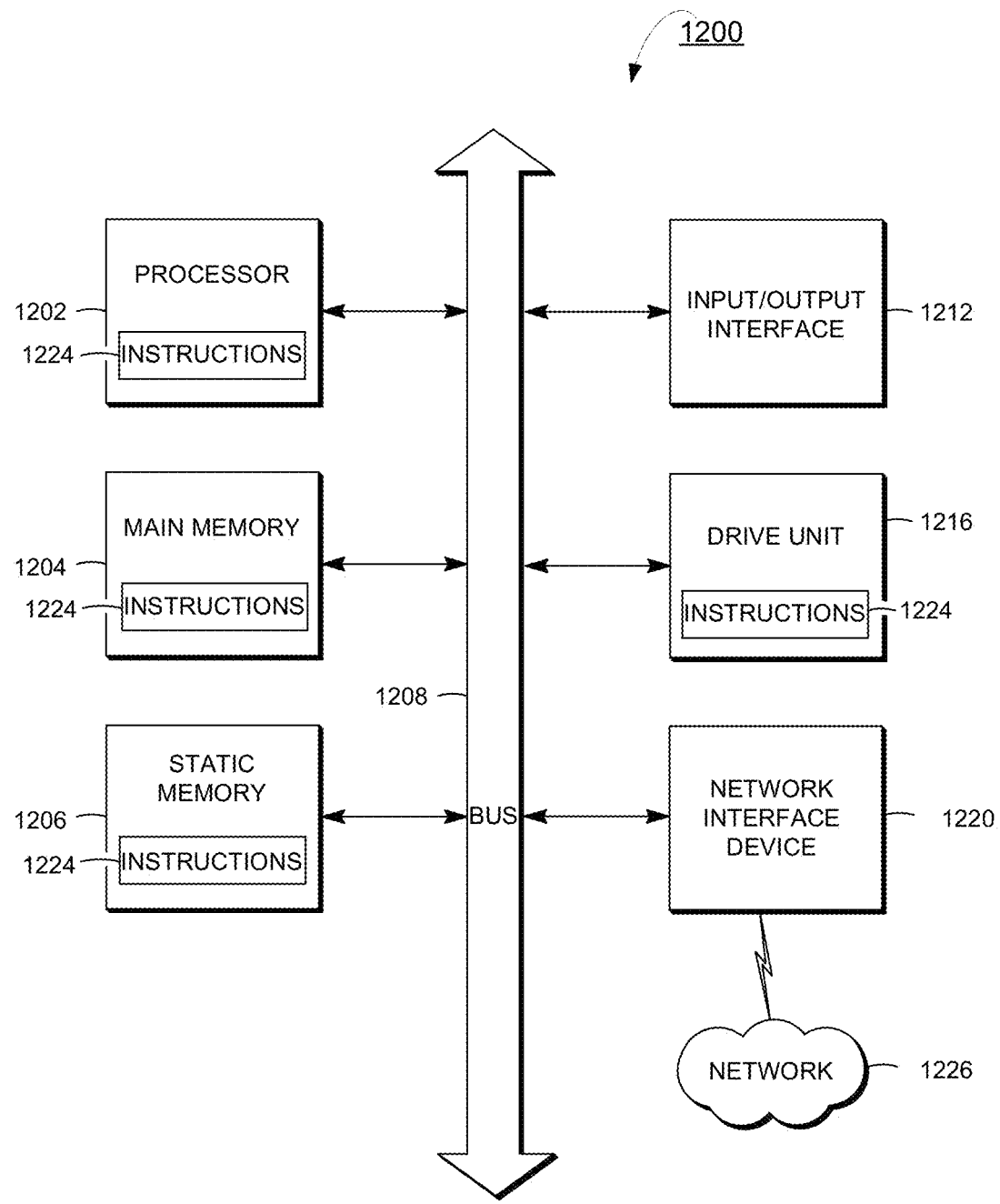
FIG. 12 is a block diagram illustrating a computer system with which any of the clients and servers of FIG. 1 may be implemented.

FIG. 12 is a block diagram illustrating a computer system with which any of the clients and servers of FIG. 1 may be implemented. In certain aspects, the computer system 1200 may be implemented using hardware or a combination of software and hardware, either in a dedicated server, or integrated into another entity, or distributed across multiple entities.

The example computer system 1200 includes a processor 1202, a main memory 1204, a static memory 1206, a disk drive unit 1216, and a network interface device 1220 which communicate with each other via a bus 1208. The computer system 1200 may further include an input/output interface 1212 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 1202 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 1224 embodying any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting machine-readable media. The instructions 1224 may further be transmitted or received over a network 1226 via the network interface device 1220.

The machine-readable medium may be a single medium or multiple media (e.g., a centralized or distributed database, and/or associated caches and servers) that store the one or more sets of instructions. The machine-readable medium may include the drive unit 1216, the static memory 1206, the main memory 1204, the processor 1202, an external memory connected to the input/output interface 1212, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for identifying an area that may be reached from a starting point in a fixed period of time (e.g., a travel range) are provided. In some aspects of the subject technology, the area that may be reached from a starting point in an allotted period of time may be determined by generating a hierarchy of maps (e.g., a "highway hierarchy") for a geographic area based on mapping data and using the hierarchy of maps to search for points in the mapping data that may be reached within the allotted cost (e.g., a period of time). In some aspects of the subject technology, the points (e.g., nodes) that may be reached within the allotted cost may be used to generate an isocontour that may be displayed in a mapping interface to illustrate the area reachable from the starting point.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for determining one or more destinations that may be reached using a hierarchy of maps, the hierarchy of maps comprising a plurality of level maps, the method comprising:
   receiving search parameters indicating a starting point of a trip and an allotted cost to one or more destinations, wherein the allotted cost is in a unit of measure;
   selecting a starting node that corresponds to the starting point on a first level map;
   identifying, using a processor, a set of nodes on the first level map wherein each node in the set of nodes has a travel cost from the starting node that is less than the allotted cost;
   for each node in the set of nodes:
      calculating a remaining cost for the node in the set of nodes, the remaining cost being a difference between the allotted cost and the travel cost for the node, and wherein the remaining cost is in the same unit of measure as the allotted cost,
      identifying second level nodes on a second level map wherein each second level node has a travel cost from the node in the set of nodes that is less than the remaining cost, and
      adding the identified second level nodes in the second level map to the set of nodes;
   determining whether further levels of maps in the hierarchy of maps are to be searched;
   searching, if further levels of maps are to be searched, the levels of maps for nodes that may be reached from the starting node given the allotted cost; and
   determining, based on the set of nodes, a geographic area that may be reached from the starting point given the allotted cost.

2. The method of claim 1, further comprising generating the hierarchy of maps based on mapping data comprising path segments and nodes, the hierarchy of maps comprising at least two levels of maps wherein each level of map contains a different level of detail.

3. The method of claim 2, wherein the hierarchy of maps are generated based on popularity levels for the path segments in the mapping data.

4. The method of claim 2, wherein the hierarchy of maps are generated based on the types of path segments in the mapping data.

5. The method of claim 1, wherein determining the one or more destinations that may be reached from the starting point given the allotted cost comprises generating an isocontour based on the set of nodes.

6. The method of claim 5, wherein the isocontour is generated using a Delaunay tessellation.

7. The method of claim 1, wherein the first level map is not the highest level map in the hierarchy of maps.

8. The method of claim 1, wherein the second level map contains a greater level of detail than the first level map.

9. The method of claim 1, wherein the first level map is not the highest level map in the hierarchy of maps, and
   wherein the first level map contains a greater level of detail than the second level map.

10. A system for determining one or more destinations that may be reached using a hierarchy of maps, the hierarchy of maps comprising plurality of levels of maps, the system comprising:
   one or more processors; and
   a machine-readable medium encoded with instructions executable by the one or more processors, the instructions comprising:
      an interface module configured to receive search parameters indicating a starting point and an allotted cost, wherein the allotted cost is in a unit of measure;
      a search module configured to:
         select a starting node that corresponds to the starting point;
         select a first level map in the hierarchy of maps that is includes the starting node;
         identify a set of nodes on the first level map wherein each node in the set of nodes has a travel cost from the starting node that is less than the allotted cost;
         determine if further level maps in the hierarchy of maps are to be searched;
      a cost module configured to calculate a remaining cost for each node in the set of nodes, the remaining cost being a difference between the allotted cost and the travel cost for the node, and wherein the remaining cost is in the same unit of measure as the allotted cost; and wherein, if further level maps are to be searched, the search module is further configured to:
    identify second level nodes in a second level map wherein each second level node has a travel cost from one of the nodes in the set of nodes that is less than the remaining cost, and
    add the identified second level nodes in the second level map to the set of nodes; and
an isocontour module configured to determine, based on the set of nodes, a geographic area that may be reached from the starting point given the allotted cost.

11. The system of claim 10, further comprising a map module configured to generate the hierarchy of maps based on mapping data comprising path segments and nodes, the hierarchy of maps comprising at least two levels of maps wherein each level of map contains a different level of detail.

12. The system of claim 11, wherein the hierarchy of maps are generated based on popularity levels for the path segments in the mapping data.

13. The system of claim 10, wherein the isocontour module is configured to determine the one or more destinations that may be reached from the starting point given the allotted cost by generating an isocontour based on the set of nodes.

14. The system of claim 13, wherein the isocontour is generated using a Delaunay tessellation.

15. The system of claim 10, wherein the first level map is not the highest level map in the hierarchy of maps.

16. The system of claim 10, wherein the second level map contains a greater level of detail than the first level map.

17. The system of claim 10, wherein the first level map is not the highest level map in the hierarchy of maps, and
    wherein the first level map contains a greater level of detail than the second level map.

18. A non-transitory machine-readable medium comprising instructions stored therein, which when executed by a machine, cause the machine to perform operations comprising:
    receiving a request to determine one or more destinations that may be reached from a starting location, the request indicating the starting location and an allotted cost, wherein the allotted cost is in a unit of measure;
    selecting a starting node and a first level map in a hierarchy of maps, wherein the starting node corresponds to the starting location;
    identifying a set of nodes on the first level map wherein each node in the set of nodes has a travel cost from the starting node that is less than the allotted cost;
    determining if further level maps in the hierarchy of maps are to be searched;
    if further level maps are to be searched:
        calculating a remaining cost for each node in the set of nodes, the remaining cost being a difference between the allotted cost and the travel cost for the node, and wherein the remaining cost is in the same unit of measure as the allotted cost,
        selecting a second level map in the hierarchy of maps,
        identifying second level nodes on the second level map wherein each second level node has a travel cost from the starting node that is less than the remaining cost, and
        adding the identified second level nodes in the second level map to the set of nodes; and
    determining, based on the set of nodes, a geographic area that may be reached from the starting point given the allotted cost.

19. The non-transitory machine-readable medium of claim 18, further comprising generating the hierarchy of maps based on mapping data comprising path segments and nodes, the hierarchy of maps comprising at least two levels of maps wherein each level of map contains a different level of detail.

20. The non-transitory machine-readable medium of claim 19, wherein the hierarchy of maps are generated based on popularity levels for the path segments in the mapping data.

21. The non-transitory machine-readable medium of claim 18, wherein determining the one or more destinations that may be reached from the starting point given the allotted cost comprises generating an isocontour based on the set of nodes.

22. The non-transitory machine-readable medium of claim 18, wherein the second level map contains a greater level of detail than the first level map.

* * * * *